3,681,095
METHOD OF PRESERVING DEHYDRATED RAW ANIMAL MEAT

Petrus Adam Inklaar, Diepenveen, Netherlands, assignor to Vasco Industries Corp., New York, N.Y.
No Drawing. Continuation of application Ser. No. 628,552, Apr. 5, 1967, which is a continuation-in-part of application Ser. No. 527,063, Feb. 17, 1966, now Patent No. 3,552,978. This application June 4, 1970, Ser. No. 41,769
Claims priority, application Netherlands, Apr. 12, 1966, 6604815
The portion of the term of the patent subsequent to Jan. 5, 1988, has been disclaimed
Int. Cl. A23b 1/04
U.S. Cl. 99—208    9 Claims

ABSTRACT OF THE DISCLOSURE

Raw animal meat preserved by dehydration, such as by freeze-drying, is enhanced in the retention of its original structure and in juice retentivity when reconstituted for consumption, by incorporating into the meat before the dehydration from 0.1 to 1% by weight of non-toxic monocarboxylic alpha amino acid that has, either of itself or by being mixed with a pH control substance, a pH between 6 and 10 when in 1% solution in water. The amino acid is incorporated into the meat by contact, such as by rubbing it on moist surfaces of the meat or immersing the meat in an aqueous solution of the amino acid or injecting such a solution into the meat.

---

This application is a continuation of my copending application Ser. No. 628,552, filed Apr. 5, 1967, now abandoned, which is a continuous-in-part of my copending application Ser. No. 527,063, filed Feb. 17, 1966, now U.S. Pat. No. 3,552,978.

There are various possibilities for preserving meat and fish. Preserving agents may be added or processes may be applied, such as smoking, salting and freeze-drying.

The invention relates to preserving methods in which the product must be reconditioned subsequently. These are the dehydrating methods, especially freeze-drying, which extract liquid moisture from the meat- or fish-product, after which it is preserved in dehydrated condition. Instead of the extraction of moisture, which generally takes place by evaporation, the water may also be extracted by freezing, by which also the reaction between meat and moisture and the action of micro-organisms is reduced to a high degree.

On reconstituting these products, a deterioration will, however, often occur; thus the meat and fish may become tough, even if every precaution is taken to reconstitute slowly and gradually and in the utmost possible sterile surroundings. The cause is probably to be seen in the fact that the dehydrated product has separated irreversibly an important amount of aqueous juices. The dehydrated product thereby gets a more fibrous, tough structure from which a large part of the flavor compounds has disappeared.

It is an object of the invention to improve the reconstitution properties of meat from whole animals such as fish or chickens or cut up animals such as pieces of beef, pork after such meat has been subjected to a treatment which separates the water aqueous juices from the cells.

Another object of the invention is to provide an additive which limits the quantity of water which is removed by the dehydration process by contacting the meat with such additive prior to or during the dehydration process.

A further object of the invention is to provide dehydrated and rehydrated meat while maintaining the original structure, consistency and taste of the original meat before dehydration.

Still another object of the invention is to improve the taste and structure of processed meat such as smoked, or salted meat by maintaining the typical flavor of the meat during and after the dehydration process.

A further object of the invention is to maintain the meat flavor and structure when such meat is subjected to a heat treatment after dehydration and reconstitution.

A special object of the invention is the pretreatment of meat which is subjected thereafter to a freeze-drying process.

It was found that a considerable improvement of the quality could be obtained by contacting the meat, before dehydration, with amino acids, containing one carboxyl group per carbon chain, which is not interrupted by hetero-atoms and which amino acids are applied either in the dry condition or in aqueous solutions with a pH of at least 6. When the dry form is chosen, the amino acid is brought into the interior of the product by pricking the meat or fish, by which the amino acid can dissolve in the already present aqueous juices. To amino acids which have not the correct pH, i.e. lower than 6 or higher than 10, substances with an alkaline or acid reaction are added to obtain the desired pH range. Also when applying the dry form, suitable admixtures must ensure that the pH when dissolved in water in 1% solution wil be above 6 and under 10. The pH must be higher than the pH of the product to be treated. Amino acids with more than one carboxyl group in a carbon chain, not interrupted by hetero-atoms, such as sulfur or nitrogen, for example glutamic acid or mixtures with salts thereof, do not belong to the invention as they are much less effective. Sodium glutamate is moreover added with another purpose, to know improvement of the taste. Substances used according to the invention are essentially important as they improve the structure and the juice retention of dehydrated and reconstituted meat.

In general these amino acids diffuse rather quick into the protein material so that the product to be treated may simply be immersed in an amino acid solution to obtain the desired effect. Dependent on the nature and the dimensions of the material and the concentration of the amino acid the product is kept 20 seconds to 10 minutes in this solution. Concentrations of the amino acid: 1, 2, 10 or more percent. Meat, such as roasted rib or pork, raw ham, beef, may e.g. be injected in an artery or also into the piece with an injection apparatus which is introduced into the meat with a great number of hollow needles, through which needles the amino acid solution is then injected under pressure.

Preferably the immersing- or injection liquid is so chosen that the pH does not become too high. This is also connected with the application method. With artery-injections it will be advantageous not to surpass a pH of 8. The same goes for injections with few hollow needles. When immersing in an aqueous liquid a pH below 8 is also preferable, whereas when using a great number of needles placed closely together, the pH may be up to 10. A too high pH may cause a tang and may also cause aqueous jelly spots in the meat.

The general formula of the preferred amino acids used according to the invention is the following

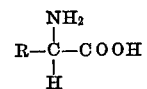

in which R represents a hydrogen atom or a straight or branched hydrocarbon chain which may be interrupted by one sulphur atom and which may be substituted by one or more amino groups.

The end group of R may be a —CH₃, —CH₂SH, —CONH₂ or

group or a phenyl- or imidazole ring.

The solubility of the amino acid in water a pH of 6 and 15° C. should be more than 1%.

The total number of carbon atoms in R should be not exceed 8.

Preferably such amino acids are used which occur in the free state in the animal body or form building elements in proteins. Such amino acids may for example be glycine, alanine, valine, leucine, isoleucine, phenylalanine, cystine, methionine, asparagine, glutamine, lysine, arginine, histidine, creatine, creatinine.

Besides the amino acids the solution may also contain other additives used for meat or fish, such as common salt, spices, phosphates in some form or another, nitrite, nitrate and/or citrates or ascorbic acid, iso-ascorbic acid, etc. The effect may best be observed if the product is kept for at least 60 days in a dehydrated condition, is subsequently reconstituted by defreezing and/or addition of moisture and is subsequently prepared in the usual way. Instead of pure amino acids one may also use mixtures, such as, especially, hydrolised proteins, which are wholly or in part converted into free amino acids or their salts.

The following examples serve as elucidations without the invention being restricted thereto.

EXAMPLE 1

Some 8 tongues weighing each 400–500 g. were filleted and the fillets were, partly immediately, partly after immersion in a 4% histidine solution with pH=7.8, which solution also contained 4% of sodium chloride, dehydrated in a Stokes sublimation dryer. The duration of the immersion was for the samples 1–6, 1, 2, 3, 4, 5 and 6 minutes respectively; temperature 5° C.

Samples 7 and 8 were immersed for one and six minutes respectively only in a 4% sodium chloride solution.

The frozen fillets were preserved for 2 months and subsequently put away in water in a cold-storage space of 8° C. After 10 minutes the products 1, 3, 5 and 7 were dried, roasted and tested by a taste panel of 5 persons. The differences between 1, 3 and 5 were not significant, but sample 7 proved to be considerably worse than the other samples as to taste as well as structure and consistence.

The even numbered samples were boiled and the numbers 4 and 6 proved to be excellent, 2 somewhat less but the blank sample again proved to be of much inferior quality. In particular it was less juicy and its structure was loose.

EXAMPLE 2

Forty raw hams each weighing about 5 kg. were divided into two lots. Twenty hams were, after having been debonded, injected with a multi-needle apparatus with 250 g. of a 5% solution of lysine which was brought to a pH of 9.7. The other 20 pieces were put into a brine bath for 12 hours. The injected ham was also put into a similar brine bath for 12 hours. The bath contained 20% of sodium chloride, 0.1% of sodium nitrite and 0.18% of potassium nitrate. After the pieces had been taken out of the bath, they were frozen, cut into slices and were subsequently subjected to sublimation drying in a Stokes sublimation dryer.

After three months the hams were slowly defrozen in water and boiled. Not only was the ham treated with amine acid juicier but it had also a much better structure and taste than the untreated hams. It could also be cut much better.

With glycine instead of lysine even slightly better results were obtained.

EXAMPLE 3

Twenty frying chickens were immersed in a 5% solution of cystine adjusted at pH=8. For comparison's sake 5 chickens of the same lot were immersed in water. The duration of the immersion was for the first group of 5 chickens 10 seconds, for the second 40 seconds, for the third 3 minutes and for the fourth 10 minutes. Immersion in water for 10 minutes.

The chickens were frozen at —10° C., subjected to a sublimation drying and then preserved at —20° C. After two months the chickens were redehydrated, slowly defrozen and grilled. The blank chickens showed fairly big differences, but they were, without exception, somewhat dry and stringy of structure. Of the immersed chickens the average of 5 chickens was, without exception better than the blank ones. Besides a difference in structure and juice retention there was a considerable difference in taste. The best group was the one of which the chickens had been immersed to 3 minutes. The 40 seconds- and 10 minutes samples did not differ much, only, according to 2 of the 5 members of the taste panel, the longer immersed chickens showed a somewhat off-taste and off-smell.

As amino acids preferably alpha-amino acids are used and those alpha-amino acids are to be preferred which are present already as such or as building stones of proteins in the animal and/or vegetable body.

The adjustment of the pH to the desired value may be effected in any known way, by addition of weak as wel as strong bases or acids as well as alkaline or acid reacting additives. Instead of the pure amino acids, hydrolized proteins may also be used, containing constituents which have not yet been decomposed to amino acids.

Other known additives, such as citrates, phosphates or other Ca and/or Mg complexing substances may also be added, which will still increase the effect.

EXAMPLE 4

500 grams of soybean protein were hydrolized in 5 liters of a 6 N hydrochloric acid solution during 10 hours while refluxing the water vapour with a reflux cooler. After that period 5 liters of water were added, the solution was filtered and then brought to a pH=8.5 by adding sodium hydroxide.

With the solution, so obtained, the experiments of the Examples 1, 2 and 3 were repeated by omitting the amino acid and sodium chloride used in said examples.

Compared with the blanks there was noted without any exception a significant improvement, especially with respect to a better structure, better cuttability and better taste. The chickens had with a 10 minute immersion a slight soy flavor which was qualified as a slight off-taste by a 7 member taste panel, who were not informed about the pretreatment.

EXAMPLE 5

The experiments of Examples 1, 2 and 3 were repeated except that instead of the amino acid used in these examples the same quantity of phenylalanine was used. The reconstituted product was without exception significantly better with respect to structure as well as flavor than the blanks.

I claim:

1. A method of preserving solid raw animal meat wherein the meat is dehydrated to a preservable state from which it will be reconstituted for consumption, which comprises incorporating at least one non-toxic alpha amino acid into the meat by contacting the solid meat with such amino acid, or with a mixture of the same and a non-toxic substance of alkaline or acid reaction, which amino acid or mixture thereof has a pH between 6 and 10 when in 1% solution by weight in water, until said amino acid is diffused into said meat in an amount sufficient to enhance retention of the original meat structure and juice retentivity in the meat when it has been dehydrated, and thereafter dehydrating the meat, said amino acid being selected from the group consisting of amino acids having the formula

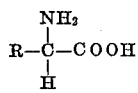

in which R represents a hydrogen atom or a straight or branched hydrocarbon chain containing not more than 8 carbon atoms, such a chain that is interrupted by one sulphur atom, or ends in a

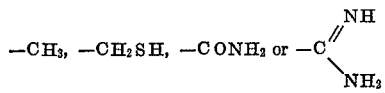

group or in a benzene or an imidazole ring, or is amino-substituted by not more than one $NH_2$ group for each carbon atom in the chain.

2. A method according to claim 1, said contacting being effected so as to incorporate from 0.1 to 1% by weight of free alpha amino acid into the meat.

3. A method according to claim 1, in which the meat is dehydrated by freeze-drying it after the incorporation of said amino acid thereinto.

4. A method according to claim 1, in which said amino acid is incorporated into the meat by immersing the meat in an aqueous solution of said amino acid having a pH between 6 and 10.

5. A method according to claim 1, in which said amino acid is incorporated into the meat by injecting thereinto through an artery thereof an aqueous solution of said amino acid having a pH between 6 and 10.

6. A method according to claim 1, in which said amino acid is incorporated into the meat by injecting thereinto, through a multiplicity of hollow needles inserted into the meat, an aqueous solution of said amino acid having a pH between 6 and 10.

7. A method according to claim 1, in which said amino acid is incorporated into the meat by rubbing the surface of the meat in moist state with a preparation containing said amino acid in finely divided solid form.

8. A method according to claim 1, in which said amino acid is incorporated into the meat by contacting the meat with a protein hydrolysis product comprising a mixture of free amino acids or of salts thereof.

9. A method according to claim 1, said meat being pieces of chicken.

References Cited

UNITED STATES PATENTS

| | | | |
|---|---|---|---|
| 2,140,781 | 12/1938 | Allen | 99—107 |
| 2,844,476 | 7/1958 | Rivoche | 99—209 |
| 2,912,337 | 11/1959 | Greenberg | 99—107 |
| 2,918,376 | 12/1959 | May et al. | 99—140 |
| 3,459,561 | 8/1969 | Mook | 99—208 |
| 3,552,978 | 1/1971 | Inklaar | 99—107 |

NORMAN YUDKOFF, Primary Examiner

H. H. BERNSTEIN, Assistant Examiner

U.S. Cl. X.R.

99—157